(12) United States Patent
Morselli

(10) Patent No.: US 11,913,481 B2
(45) Date of Patent: Feb. 27, 2024

(54) ATTENUATION DEVICE FOR THE FLUID FLOW PULSATION IN A HYDRAULIC CIRCUIT CONNECTED WITH A HYDRAULIC MACHINE

(71) Applicant: STEM NUMERICAL ENGINEERING S.R.L., Modena (IT)

(72) Inventor: Mario Antonio Morselli, Modena (IT)

(73) Assignee: STEM NUMERICAL ENGINEERING S.R.L., Modena (IT)

( * ) Notice: Subject to any disclaimer, the term of this patent is extended or adjusted under 35 U.S.C. 154(b) by 589 days.

(21) Appl. No.: 17/255,587

(22) PCT Filed: Jun. 27, 2019

(86) PCT No.: PCT/IB2019/055446
§ 371 (c)(1),
(2) Date: Dec. 23, 2020

(87) PCT Pub. No.: WO2020/003190
PCT Pub. Date: Jan. 2, 2020

(65) Prior Publication Data
US 2021/0164502 A1   Jun. 3, 2021

(30) Foreign Application Priority Data

Jun. 28, 2018   (IT) .................. 102018000006768

(51) Int. Cl.
*F15B 21/00* (2006.01)
*F04B 11/00* (2006.01)
*F16L 55/027* (2006.01)

(52) U.S. Cl.
CPC ........ *F15B 21/008* (2013.01); *F04B 11/0091* (2013.01); *F15B 2211/8616* (2013.01); *F16L 55/02772* (2013.01)

(58) Field of Classification Search
CPC ........... F15B 21/008; F15B 2211/8616; F04B 11/0091; F16L 55/02772
See application file for complete search history.

(56) References Cited

U.S. PATENT DOCUMENTS

| 9,605,632 B1* | 3/2017 | Leffler | F02M 35/1261 |
| 2014/0245733 A1* | 9/2014 | White | F15B 21/008 |
| | | | 138/26 |
| 2016/0102637 A1* | 4/2016 | Desjardins | F02M 35/02 |
| | | | 55/385.3 |

FOREIGN PATENT DOCUMENTS

| WO | WO-2007124552 A1 * | 11/2007 | ......... F04B 39/0066 |
| WO | WO-2007124552 A1 | 11/2007 | |

(Continued)

OTHER PUBLICATIONS

International Search Report dated Oct. 10, 2019 in PCT/IB2019/055446 (3 pages).

(Continued)

*Primary Examiner* — Forrest M Phillips
(74) *Attorney, Agent, or Firm* — Element IP, PLC.

(57) ABSTRACT

The present invention concerns an attenuation device (1) of the fluid flow pulsation along a duct of a hydraulic circuit connected with a hydraulic machine, comprising at least an attenuation module (3) passed through by a pass-through duct (5) configured to be placed in fluid communication with said duct of said hydraulic circuit. In particular, in said attenuation module (3) a first duct (7) is obtained having an opened first end (70) in fluid communication with said pass-through duct (5), and a closed second end, said first duct (7) extending along a curved line comprising a plurality of curved sections, said first duct (7) being adapted to attenuate the pulsation of said fluid flow along said duct of (Continued)

said hydraulic circuit to reduce the vibrations generated by said pulsation of said fluid flow.

27 Claims, 13 Drawing Sheets

(56) References Cited

FOREIGN PATENT DOCUMENTS

WO     WO-2008086777 A1     7/2008
WO     WO-2019121744 A1 *     6/2019     ......... F02M 35/1261

OTHER PUBLICATIONS

Written Opinion dated Oct. 10, 2019 in PCT/IB2019/055446 (6 pages).

\* cited by examiner

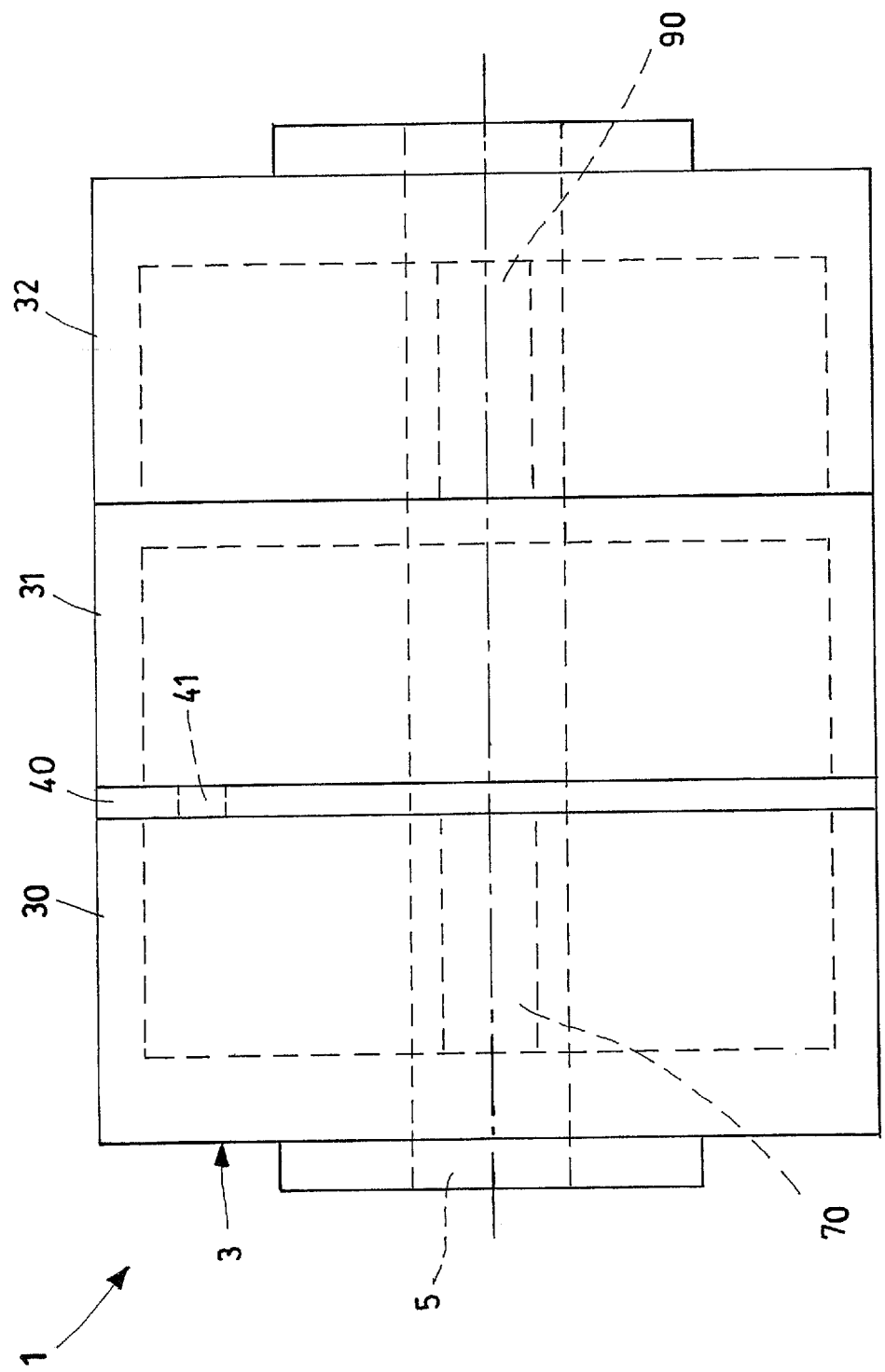

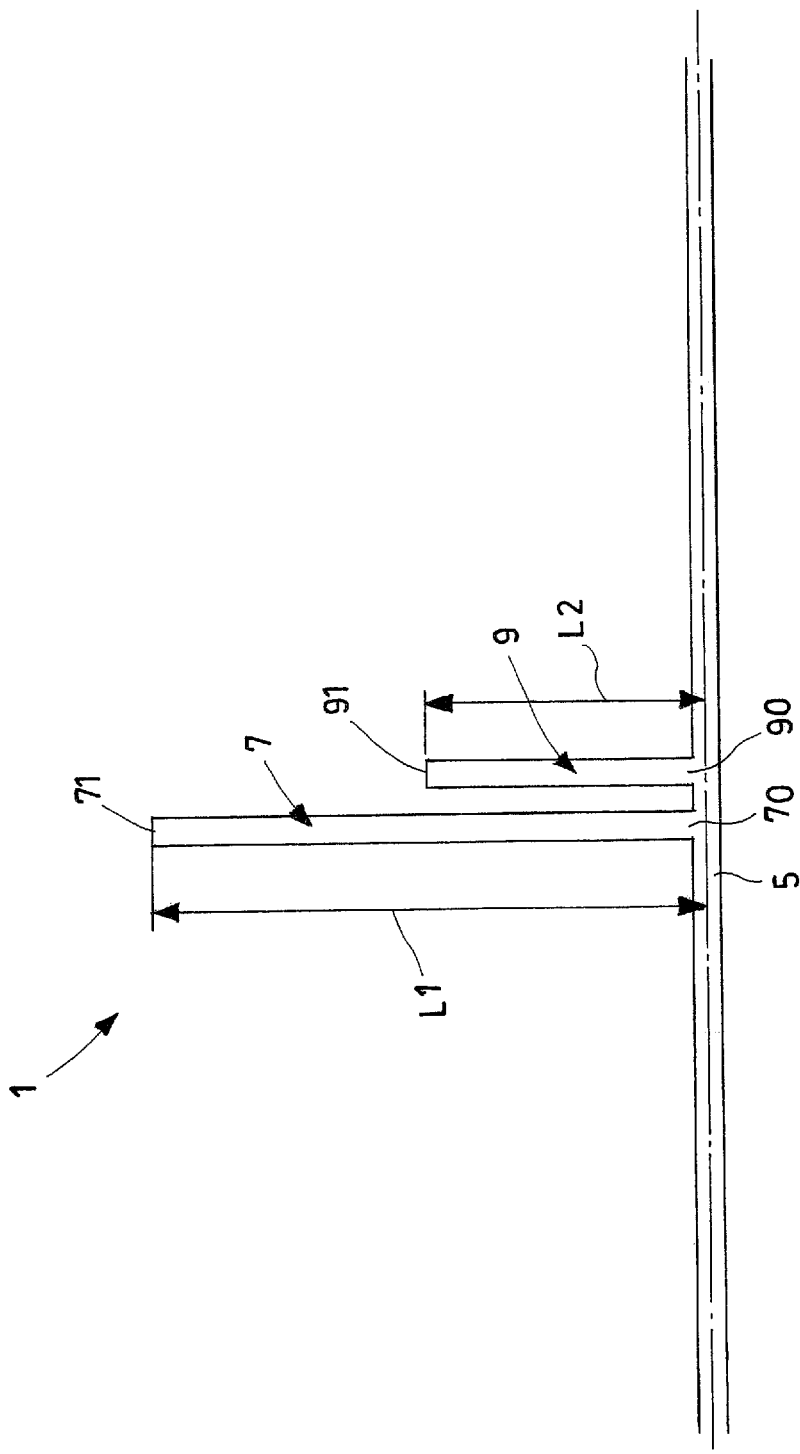

ATTENUATION DEVICE FOR THE FLUID FLOW PULSATION IN A HYDRAULIC CIRCUIT CONNECTED WITH A HYDRAULIC MACHINE

The present invention refers to an attenuation device of the fluid flow pulsation in the hydraulic circuit connected with a hydraulic machine, such as a motor, a pump or in any case a hydraulic machine disturbed by a cyclical perturbation.

As known, pumps and motors, in particular if of the volumetric type, generate big pulsations of the fluid flow that is pumped in the delivery duct.

Such pulsations generate harmful vibrations that transmit both to the machine itself, whether it is a pump or a motor, and to the system in which the machine is installed, thus reducing the life of the machine and, over time, also compromising the operation of the system, as well as generating noise or discomfort whenever these pulsations make components in contact with air or components close to a user vibrate, as can occur for the operator of an earth moving machinery. Indeed, the vibrations induced by the pulsations of the fluid flow also generate a considerable and annoying acoustic noise.

Currently, in particular in the case of volumetric pumps, it is known to apply damping devices downstream of the pump, consisting of so-called pulsation dampers. Such damping devices actually consist of a chamber in fluid communication with the delivery duct of the volumetric pump.

These devices can be categorized as "resonators" like Helmoltz resonators and accumulators, i.e. cylinders full in one part with pressurized nitrogen, separated from the fluid by a membrane. There are also other devices with mobile parts that have never had particular commercial success due to the complexity, unreliability or poor efficiency, as well as due to the fact that they are themselves the source of noise.

Such known damping devices are not without drawbacks, including the fact that they are not able to efficiently damp the pulsations of the fluid flow because in general they operate in a very narrow frequency range, like in the particular case of Helmoltz resonators.

Other damping devices combine a pressurized accumulation area with a chamber equipped with holes, so as to generate a damping.

These devices, although generally more efficient than Helmoltz resonators, are however complex and expensive. Moreover, in the same way as accumulators, they provide for a membrane subject to the danger of breaking due to fatigue or wear.

In any case, the efficiency of such damping devices also depends on dissipative phenomena. Considering that often the pressure pulsation is of about 10-15% of the delivery pressure it is clear that the amount of energy dissipated by such devices is significant in relation to the hydraulic energy involved.

The main aim of the present invention consists of making an attenuation device of the fluid flow pulsation in the hydraulic circuit connected with a hydraulic machine that avoids the drawbacks and overcomes the limitations of the prior art, making it possible to efficiently attenuate the pulsations of the fluid flow.

In the context of this aim, an object of the invention is to make an attenuation device that makes it possible to attenuate the pulsations of the fluid flow without using mainly dissipative effects but exploiting interference effects between the waves.

Another object of the present invention is to make an attenuation device that drastically reduces the vibrations connected to the pulsation of the fluid flow.

Another object of the invention consists of making an attenuation device that is capable of drastically reducing also the acoustic noise generated by the pump, or by the motor, in operation.

A further object of the invention consists of making an attenuation device that has a very small footprint.

Yet another object of the present invention is to make an attenuation device that is particularly simple to make, functional, and with low costs.

Yet another object of the present invention is to make an attenuation device that is effective in a wide band of frequencies.

A further object of the invention consists of making an attenuation device that is capable of giving the greatest guarantees of reliability and safety in use.

The aim outlined above, as well as the stated objects and others that will become clearer hereinafter, are achieved by an attenuation device of the fluid flow pulsation in the hydraulic circuit connected with a hydraulic machine as stated in claim 1.

Other characteristics are provided in the dependent claims.

Further characteristics and advantages will become clearer from the description of preferred, but not exclusive embodiments of an attenuation device of the fluid flow pulsation in the hydraulic circuit connected with a hydraulic machine, illustrated for indicating and not limiting purposes with the help of the attached drawings, in which:

FIG. 5 is a top side view of the attenuation device, according to the invention;

FIG. 6 is a schematic view that illustrates the operating principle of the attenuation device, according to the invention;

Figure 1:
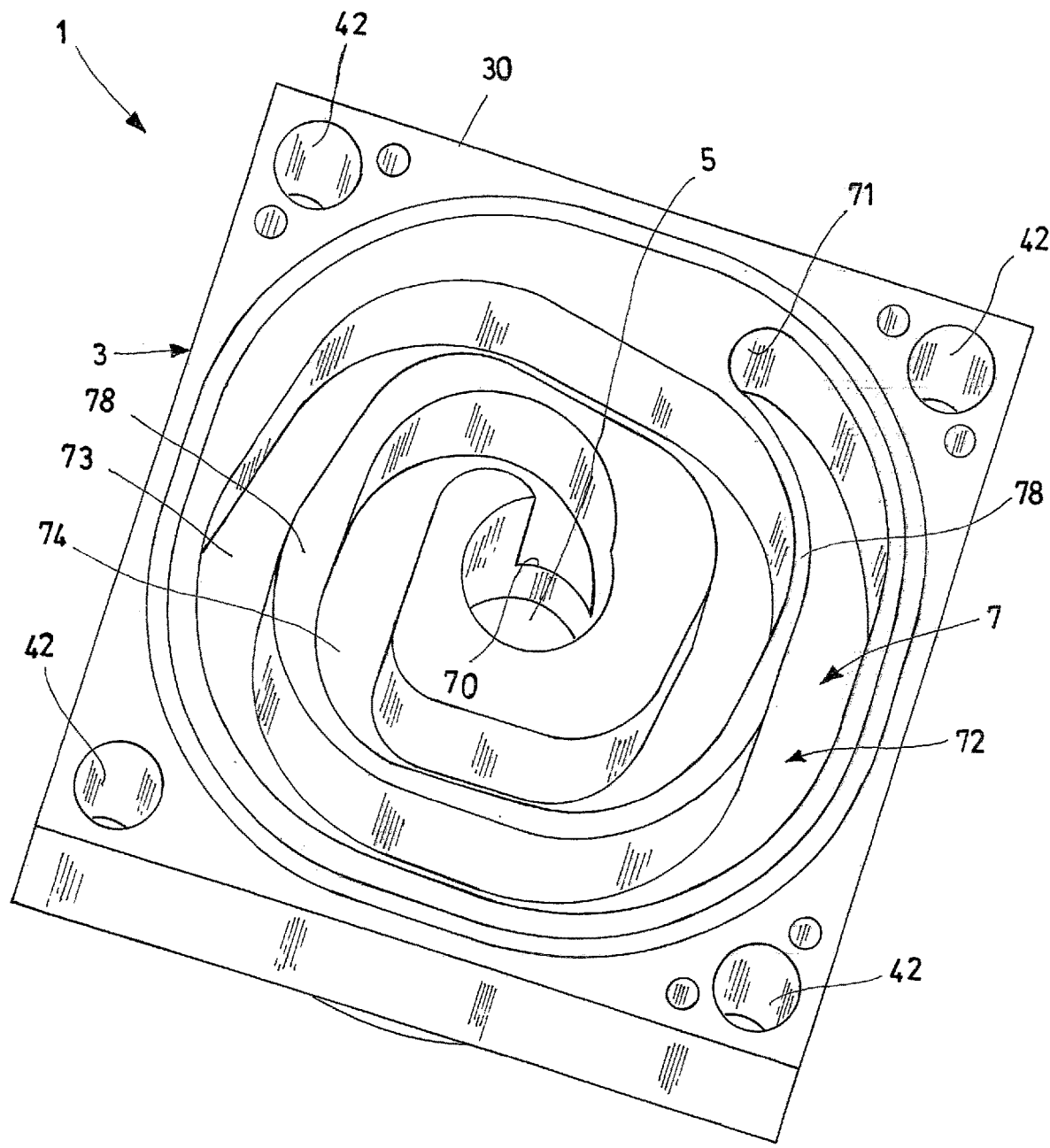
FIG. 1 is a perspective view of the main component of the attenuation device, according to the invention.
Figure 2:
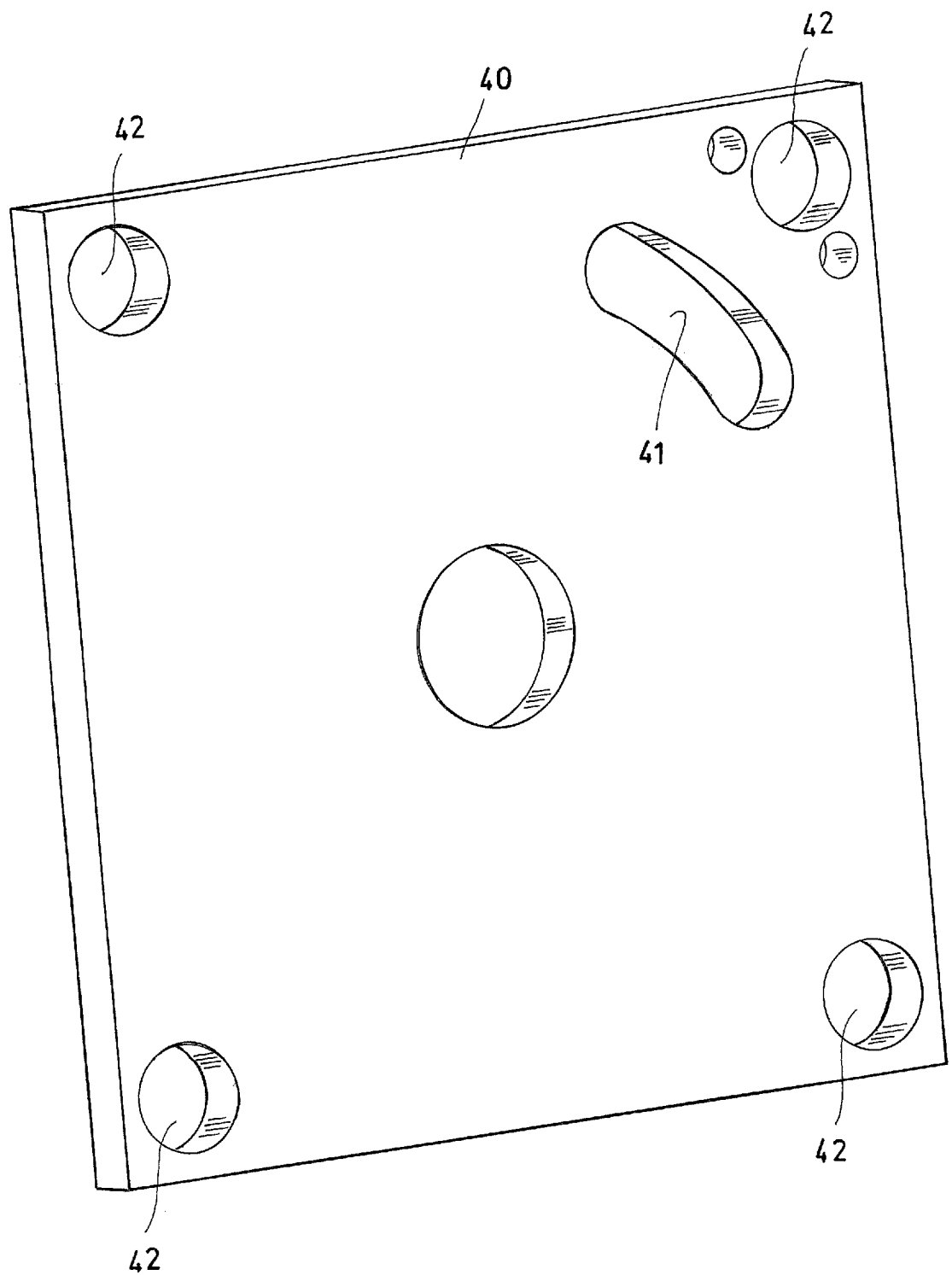
FIG. 2 is a perspective view of a secondary component of the attenuation device, according to the invention.

With reference to the quoted figures, the attenuation device of the fluid flow pulsation along a duct of a hydraulic circuit connected with a hydraulic machine, globally indicated with reference number 1, comprises at least an attenuation module 3 passed through by a pass-through duct 5 configured to be placed in fluid communication with said duct of said hydraulic circuit, like for example the delivery duct of a volumetric pump.

The embodiment of the attenuation device 1 described hereinafter, and illustrated in the attached figures, refers, only as a non-exhaustive example, to the application to a hydraulic circuit connected to a pump.

The attenuation device 1 is also adaptable to other hydraulic circuits of different hydraulic machines, like for example a motor.

In the case of a volumetric pump the pass-through duct 5 is advantageously configured to be placed in fluid communication with the delivery duct of the pump. In particular, the pass-through duct 5 can be connected, at a first end, to the delivery duct of the pump, and at a second end with a pipe belonging to the hydraulic circuit of the hydraulic machine.

According to the invention, in said attenuation module 3 a first duct 7 is obtained having an opened first end 70 in fluid communication with the pass-through duct 5, and a closed second end. The first duct extends between the opened first end 70 and the closed second end along a curved line comprising a plurality of curved sections, where at least two curved sections 73, 74 of the first duct 7 are separated from one another by a shared separation wall 78. The first duct 7 is adapted for damping the pulsation of the flow pumped by said volumetric pump to reduce the vibrations generated by said pulsation of said fluid flow.

Advantageously, as illustrated in the attached FIGS. 1 to 5, the first duct 7 extends along a spiral curved line. The curved sections 73, 74 of the duct 7 are thus separated by a shared separation wall 78, which also extends along a spiral curved line.

As illustrated in the attached FIGS. 1 to 5, the first duct 7 does not necessarily extend along a spiral curved line in the mathematical sense of the term, but along a curved line that winds in a spiral around itself, which can also comprise sections with rectilinear extension. The term "curved sections" is thus also meant to indicate sections that are partially curved and partially straight.

Advantageously, as better described hereinafter, the first duct 7 extends along at least two spiral curved lines in mutual communication at one end thereof. Advantageously the at least two spiral curved lines have a substantially similar length.

Advantageously, as better described hereinafter, the first duct 7 extends along two specular spiral curved lines, of opposite direction, in mutual communication at an end thereof.

Alternatively, the first duct 7 can extend, inside the attenuation module 3, also along a curved serpentine line.

A curved serpentine line provides for an alternate progression of loops and sections with more or less rectilinear extension. The term "curved sections" is thus meant to indicate sections having an extension that is partially curved and partially rectilinear. The shared separation wall between two so-called curved sections can thus also have an extension that is partially curved and partially rectilinear.

Figure 7:
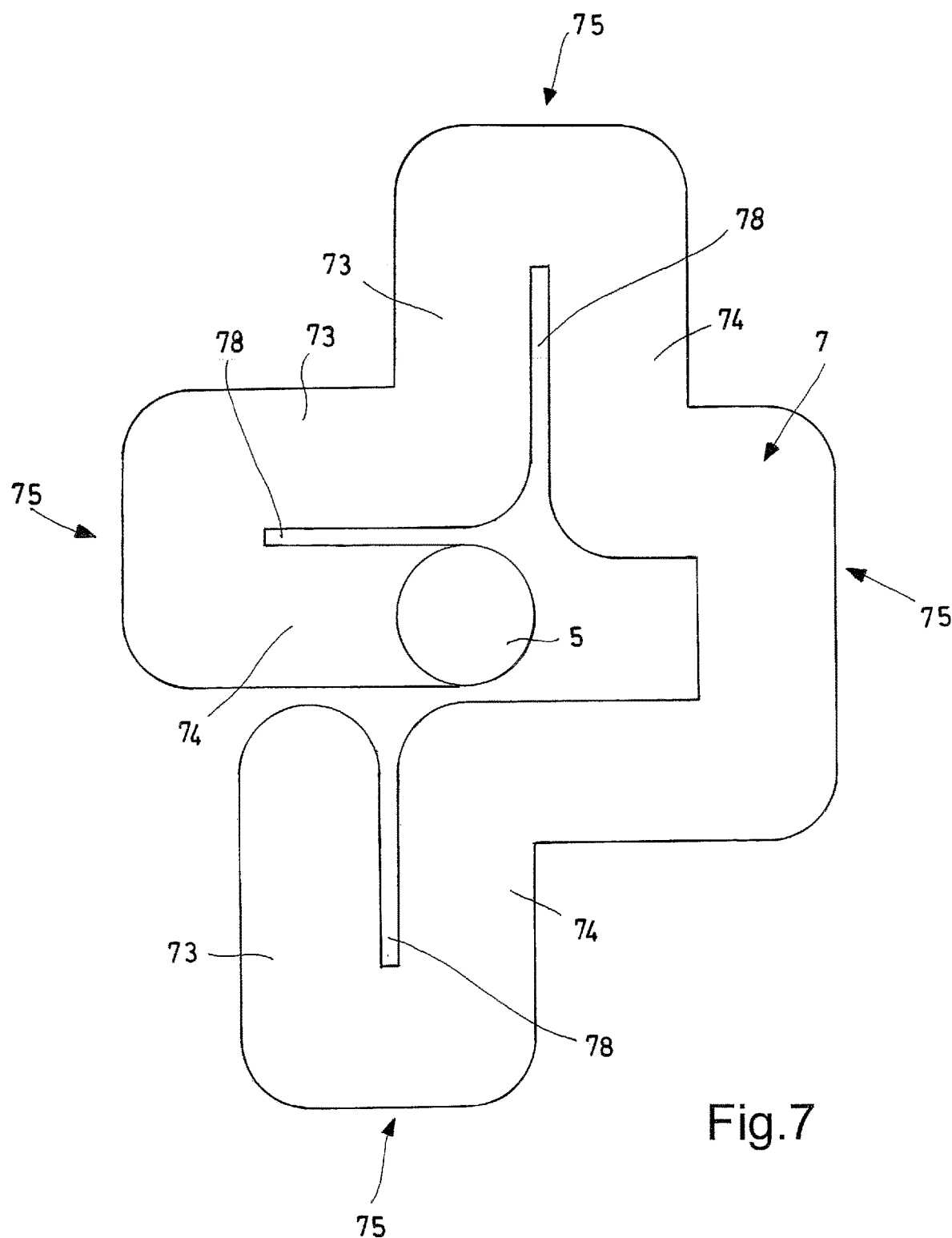
FIG. 7 is a schematic view of a variant of an attenuation duct present in the attenuation device, according to the invention.

According to a further alternative schematically illustrated in FIG. 7, the first duct 7 can extend along a curved line, whose loops 75 are arranged radially with respect to the central pass-through duct 5, in a configuration that is similar to a Greek cross.

Figure 8:
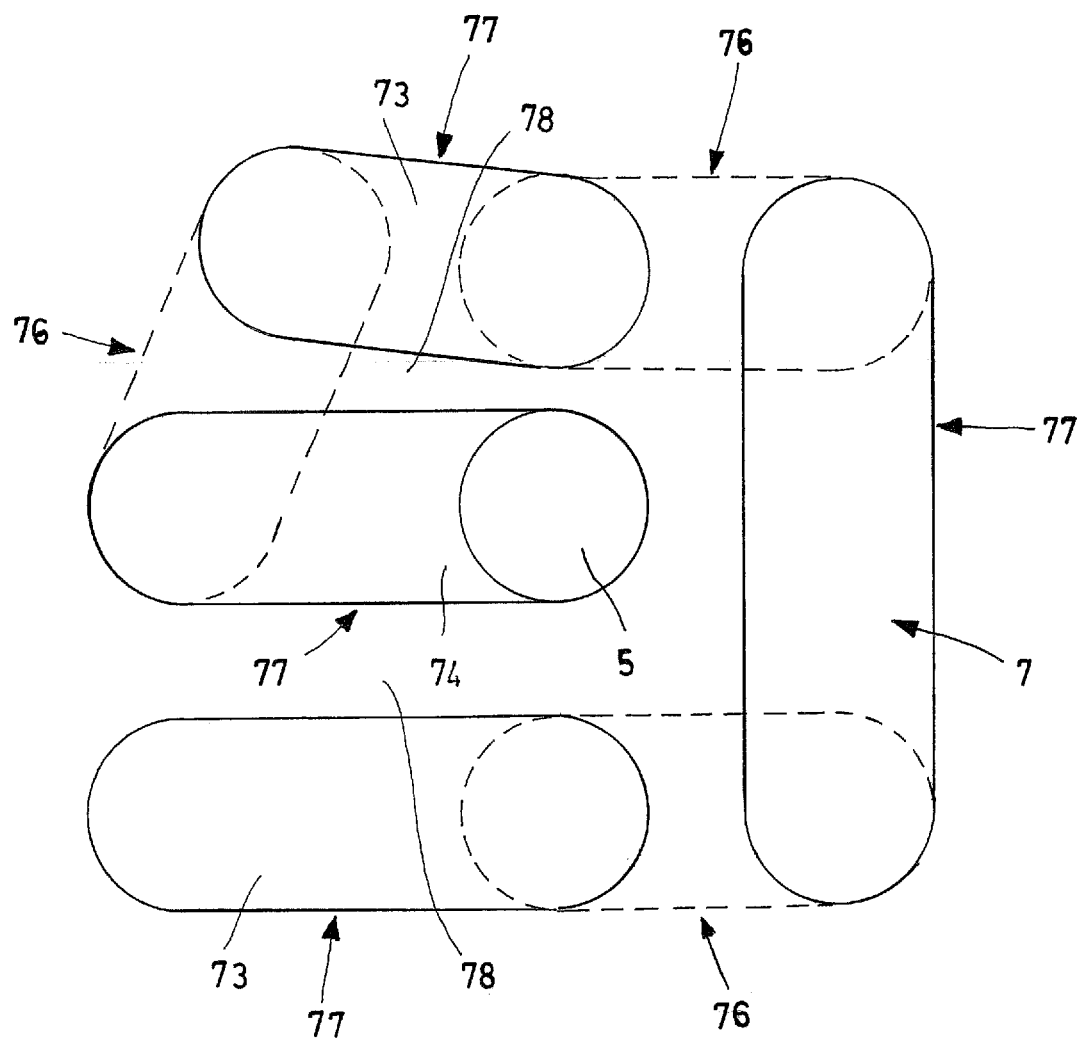
FIG. 8 is a schematic view of a further variant of an attenuation duct present in the attenuation device, according to the invention.

According to yet another alternative, schematically illustrated in FIG. 8, the first duct 7 can extend along a line that engages a volume. In the example of FIG. 8 the curved sections 76 illustrated with a broken line, are arranged on a different plane with respect to the curved sections 77, connected to the previous ones to define the overall path of the first duct 7. Specifically, the different curved sections 76 and 77 can be obtained in different and mutually facing rigid bodies.

Also in this case some curved sections 73, 74 are separated by a shared separation wall 78.

Furthermore, the first duct 7 can extend along a toric and/or helical line.

Advantageously, the length L1 of the extension of the first duct 7 is substantially equal to ¼ of the wavelength of the main component (also called fundamental harmonic or first harmonic) of the wave generated by the pulsation of said fluid flow.

In this way, a ¼ wave filter is made that is capable of dephasing by ½ period the main component of the wave generated by the pulsation of the fluid, thus determining a destructive interference that, in ideal conditions, cancels the amplitude of the wave itself.

Hereinafter, some numerical examples of sizing of the first duct 7 are given.

The speed of the sound inside the delivery pipes of an oil volumetric pump is about 1400 m/s.

A volumetric pump with 10 teeth, or with 10 pistons, or 10 compartments, or in any case having 10 pumping elements, which rotates as a speed of 1500 revs/minute, generates pulsations of the fluid flow at a frequency of 250 Hz, from which it derives that the wavelength of the sound is equal to about 5.6 m.

In order to generate a dephasing of ½ period, therefore, the length of the duct 7 that acts as ¼ wave filter should be substantially equal to 1.4 m.

Similarly, a pump having 9 teeth (or pistons, or compartments, or pumping elements) that rotates at a speed of 1500 revs/minute generates pulsations of the fluid flow pumped at 225 Hz. This corresponds to a wavelength equal to about 6.2 m which requires a length of the duct 7 substantially equal to 1.55 m.

Pumps having 7 teeth (or pistons, or compartments, or pumping elements), in the same operating conditions, require a duct 7 that is substantially 2 m long.

The fact that the first duct 7 extends along a curved line comprising a plurality of curved sections allows the duct itself to be dimensionally compatible with the typical dimensions of volumetric pumps, and in general with the typical dimensions of hydraulic machines.

Advantageously, in the attenuation module 3 a second duct 9 is obtained having an opened first end 90 in fluid communication with said pass-through duct 5, and a closed second end. The second duct 9 also extends along a curved line comprising a plurality of curved sections. Such second duct 9 is adapted to damp the second order pulsation of the pumped flow, i.e. the component of the wave linked to the second harmonic.

In this way the acoustic noise generated by the pulsation of the fluid flow is advantageously further reduced.

Advantageously, the length L2 of the extension of the second duct 9 is substantially equal to ⅛ of the wavelength of the main component of the fluid flow pulsation, the second duct 9 thus being approximately half the length of the first duct 7, where, however, these lengths can be changed as a consequence of the analysis of the harmonic components contained in the disturbance to be attenuated, where it is verified that the wavelengths involved differ from nominal ones.

Advantageously, such second duct 9 is arranged downstream of said first duct 7, with respect to the running of the fluid flow pumped inside the pass-through duct 5.

Frequently, the disturbances induced by hydraulic machines have a very large component in frequency of the second order (i.e. second harmonic), of amplitude also comparable with the amplitude of the main frequency (i.e., first harmonic).

A ¼ wave filter tends to cause a constructive interference between the components of the first and second order, thus generating disturbance phenomena.

The fact that a second duct 9 is placed a short distance from the first duct 7 makes it possible to reduce also the components in frequency of the second order of the fluid pulsation.

In the much less frequent cases in which the third harmonic is predominant with respect to the second, the second duct 9 makes it possible to reduce also the components in frequency of the third order of the fluid pulsation where it is sized at 1/12 of the wave instead of at 1/8.

Similarly, the above can be obtained for the fourth harmonic where the second duct 9 is sized at 1/16 of the wave instead of at 1/8.

In complex cases the combination of three or more attenuation ducts makes it possible to manage the attenuation of different combinations of harmonics, when the significant ones are spaced between different orders in number greater than two, in this way adapting the combination of the modules to the harmonic content of the disturbance.

FIG. 6 schematically shows the arrangement of the aforementioned ducts 7, 9 with respect to the pass-through duct 5.

Advantageously, the distance between the first duct 7 and the second duct 9 is negligible with respect to the wavelength of the wave that is generated by the pulsation of the fluid.

Advantageously, as illustrated in the attached FIGS. 1 to 5, the second duct 9 extends along a spiral curved line.

Alternatively, the second duct 9 can extend, inside the attenuation module 3, also along a curved serpentine line.

The second duct 9 can also take up the configurations illustrated in FIGS. 7 and 8 with reference to the first duct 7, or other similar configurations.

Advantageously, the attenuation module 3 comprises at least one rigid body 30, 31, 32 in which the first duct 7 and/or the second duct 9 is obtained.

Advantageously, the attenuation module 3 comprises a pair of mutually associated rigid bodies 30, 31. A first portion 72 of the first duct 7 is made in a first rigid body 30 of said pair of rigid bodies 30, 31 whereas a second portion of the first duct 7 is made in the second rigid body 31.

Advantageously, the attenuation module 3 comprises a third rigid body 32 in which the second duct 9 is obtained.

As illustrated in the attached figures, the attenuation device 1 can comprise a ¼ wave filter, obtained inside the rigid bodies 30 and 31, and a 1/8 wave filter obtained inside the rigid body 32.

Figure 11:
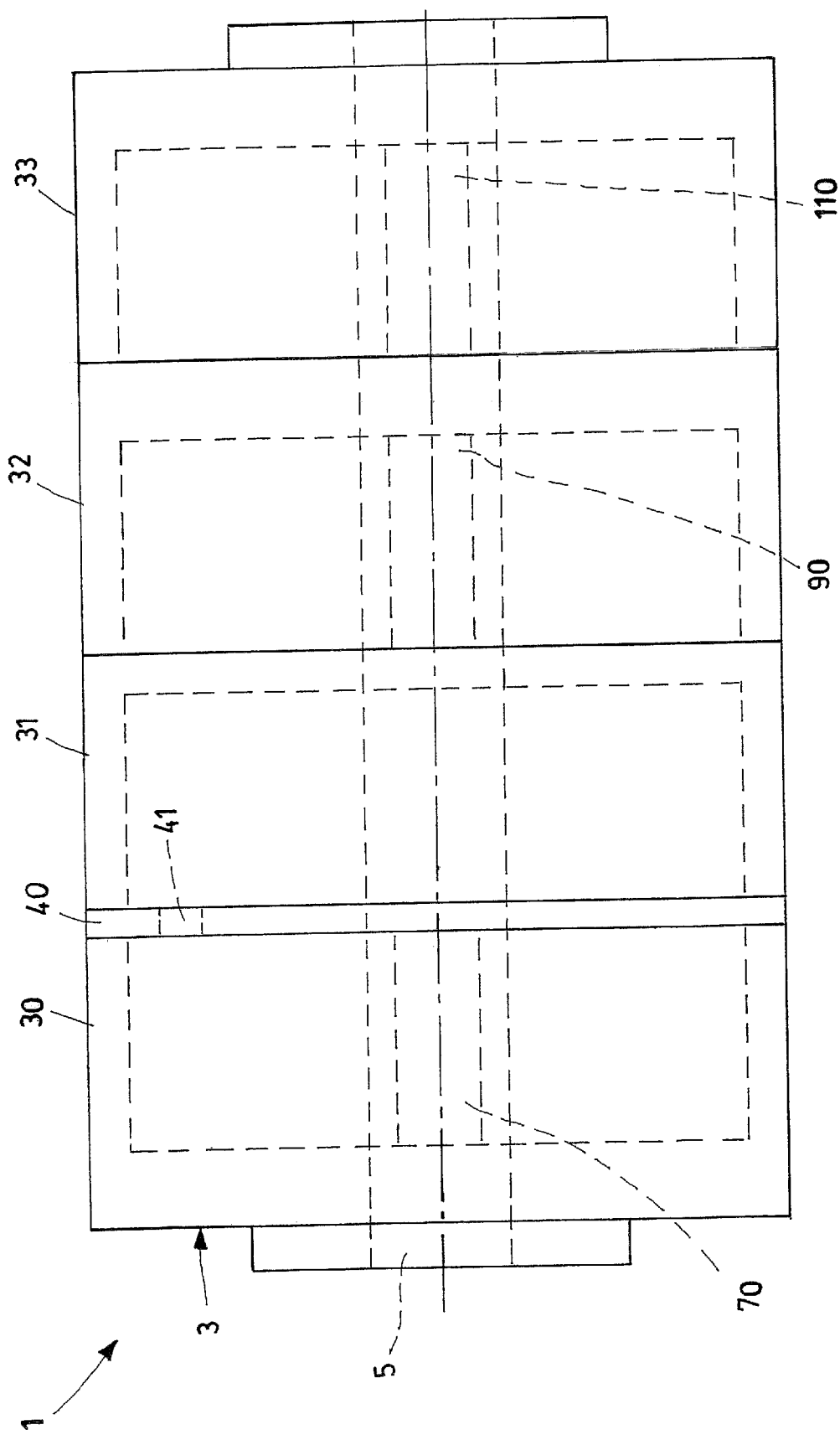
FIG. 11 is a top side view of a further embodiment of the attenuation device, according to the invention.

In other cases, the attenuation device 1 can comprise a first ¼ wave filter, obtained inside the rigid bodies 30 and 31, a second 1/8 or 1/12 wave filter or 1/16 wave filter obtained inside the rigid body 32 and a third 1/16 wave filter or 1/12 wave filter obtained inside a further rigid body 33, as illustrated in FIG. 11.

The ¼ wave filter is defined by the two mutually facing rigid bodies 30, 31 by means of a connection plate 40.

The first duct 7 is thus partially obtained in the first rigid body 30, and partially in the second rigid body 31, being advantageous for these two parts to be configured according to a spiral and being also advantageous for these spirals to have the same direction if observed side-by-side, so that, once facing each other, the direction is opposite.

Basically, from the pass-through duct 5 the fluid enters through the first end 70 of the first duct 7, crosses the spiral section 72 inside the first rigid body 30, up to the second end, indicated with 71, from this area, through the hole 41 obtained in the connection plate 40, the fluid passes in the spiral section obtained inside the second rigid body 31, until the closed end of the first duct 7 is reached.

Advantageously, the first duct 7 extends along two spiral lines separated by the connection plate 40 and placed in communication at their ends through the hole 41 obtained in the connection plate 40 that separates them.

In order to make the 1/8 wave filter it is, on the other hand, sufficient to use only the third rigid body 32.

Figure 10:
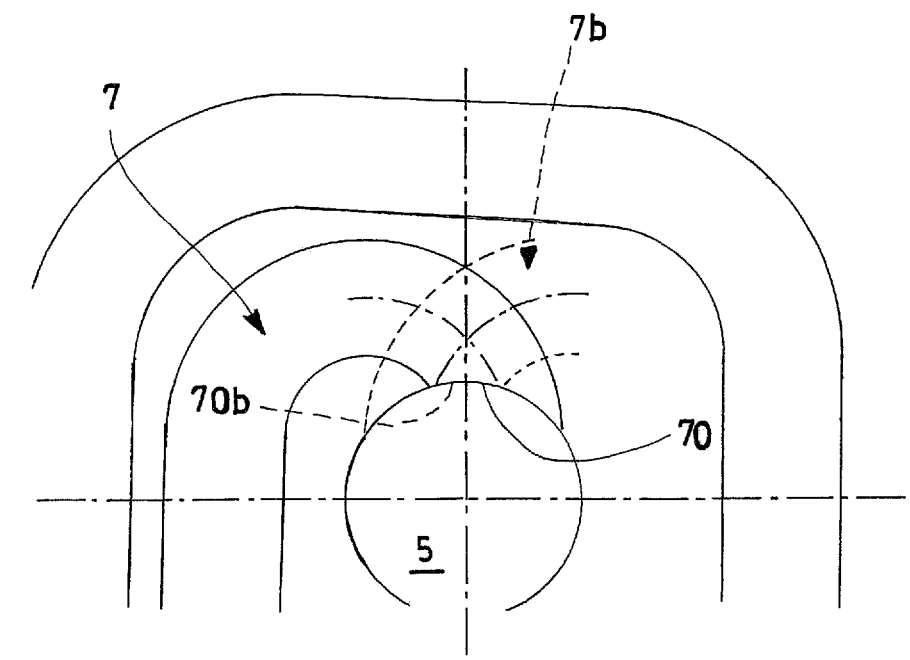

It is advantageous for the ¼ wave ducts and 1/8 wave ducts for the communication port 70, 90 with the central pass-through duct 5 to be aligned in the direction of the axis of the pass-through duct 5 itself, as can be seen in FIG. 5 and in FIG. 10.

As illustrated in FIG. 5 where the spiral modules 30 and 32 have a communication port with the pass-through duct 5, while the module 31 is blind towards the pass-through duct 5, the blind duct section is in intermediate position between the two ducts. In FIG. 10 reference numeral 70b indicates the portion of the duct 7b present in the module 31 that is roughly in proximity to, or close to, the pass-through duct 5.

Figure 9:
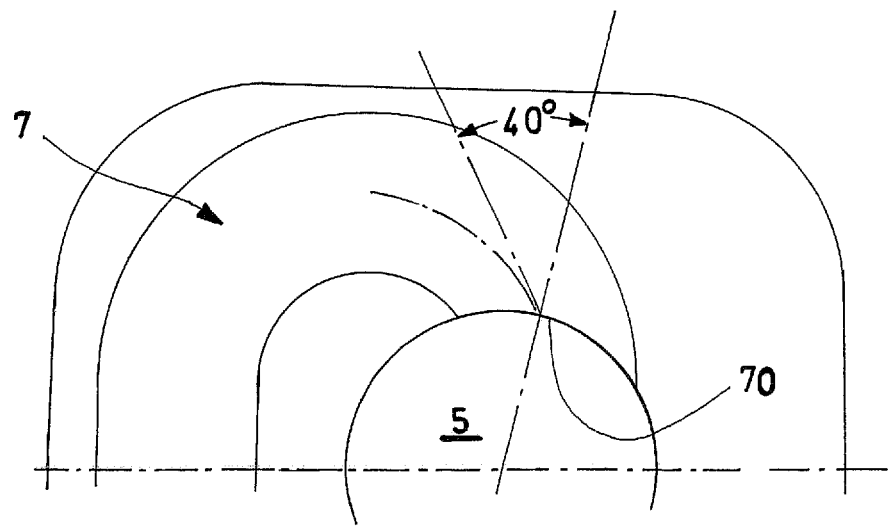
FIGS. 9 and 10 are enlarged portions of FIG. 3 and illustrate further details of the attenuation device, according to the invention.

As can be seen in FIG. 9, moreover, the input mean angle α of the first duct 7, and/or of the second duct 9, in the pass-through duct 5 is advantageously between 20° and 60°, preferably between 30° and 50° and even more preferably is substantially equal to 40°.

It is also advantageous for the two input ports of the ducts 7 and 9 to be separated by a section of similar length to that of the ports themselves, as can be seen in FIG. 5.

Basically, the distance between the input window 70 of the first duct 7 in the pass-through duct 5 and the input window 90 of the second duct 9 in the pass-through duct 5 is substantially equal to the axial length of the window 70 or 90 itself.

Advantageously, the input mean angle α of the second duct 9 in the pass-through duct 5 has an opposite direction with respect to that of the input mean angle α of the first duct 7 in the pass-through duct 5, advantageously being said distance between the input window 70 of the first duct 7 in the pass-through duct 5 and the input window 90 of the second duct 9 in the pass-through duct in a range between 0.5 and 2 times the axial length of the window 70 or 90 itself.

Advantageously, the three rigid bodies 30, 31 and 32 can be modular and thus made substantially identical to each other.

In this case, it is however foreseen that the second rigid body 31, i.e. the rigid body in which the second half of the first duct 7 is defined, does not communicate with the pass-through duct 5 and instead makes the closed end of the first duct 7.

Advantageously, indeed, a pressed bushing can be applied that closes the central hole at the pass-through duct 5.

Advantageously, two rigid bodies 30, 31 that are mutually associated in the direction of flow of the fluid inside the central duct 5 can have a polygonal cross section, preferably with four sides, even more preferably substantially square.

As also explained hereinafter, there can be fixing means of such rigid bodies 30, 31 arranged at the vertices of the polygonal cross section, for example arranged at the four vertices in the case of a substantially square cross section.

Preferably, as illustrated in the attached figures, the rigid bodies 30, 31 and 32 can have a square section, or substantially square section with rounded corners.

The shape of the polygonal section, preferably rectangular or square, or substantially square, keeping all other mechanical characteristics the same, gives a lower rigidity to the attenuation device 1 with respect to a circular section, since the sides of the rigid bodies 30, 31, 32, when subjected to a high distributed pressure of the fluid present in the attenuation device 1, tend to deform by curving, which cannot occur in the case of structures having already circular section.

The spiral ducts 7 and 9 can be obtained inside such rigid bodies 30, 31 and 32 so as to have walls with non-uniform and non-regular thicknesses, in this way avoiding the generation of its own resonant frequencies.

Advantageously, the rigid bodies 30, 31 and 32 are made of aluminum alloy.

Advantageously, indeed, aluminum has a lower elastic modulus with respect to that of other materials, like for example steel.

As also explained hereinafter, the choice of a material having a lower elastic modulus gives greater compliance to the attenuation device 1, and in particular to the separation walls 78 shared between the curved sections 73, 74 of the first duct 7 (or of the second duct 9) actually lowering the intrinsic rigidity thereof.

FIG. 11 illustrates a further embodiment of the attenuation device 1, in which a further rigid body 33 is also provided that contains a third duct, having its own end 110 in fluid communication with the pass-through duct 5. The third duct defined above will not necessarily be in succession with the first duct 7, with this depending on whether one or other harmonic is predominant in amplitude.

Advantageously, the section of the opening that places the pass-through duct 5 in communication with the first duct 7 and/or with the second duct 9 as well as the cross section of the first duct 7 and/or of the second duct 9, have an area substantially equal to the area of the section of the pass-through duct 5. In this way, the two waves respectively present in the pass-through duct 5 and in the first duct 7 (or in the second duct 9), as well as being in counterphase, also have similar powers.

Advantageously, the cross section of the first duct 7 and/or of the second duct 9 have a substantially rectangular configuration.

Figure 4:
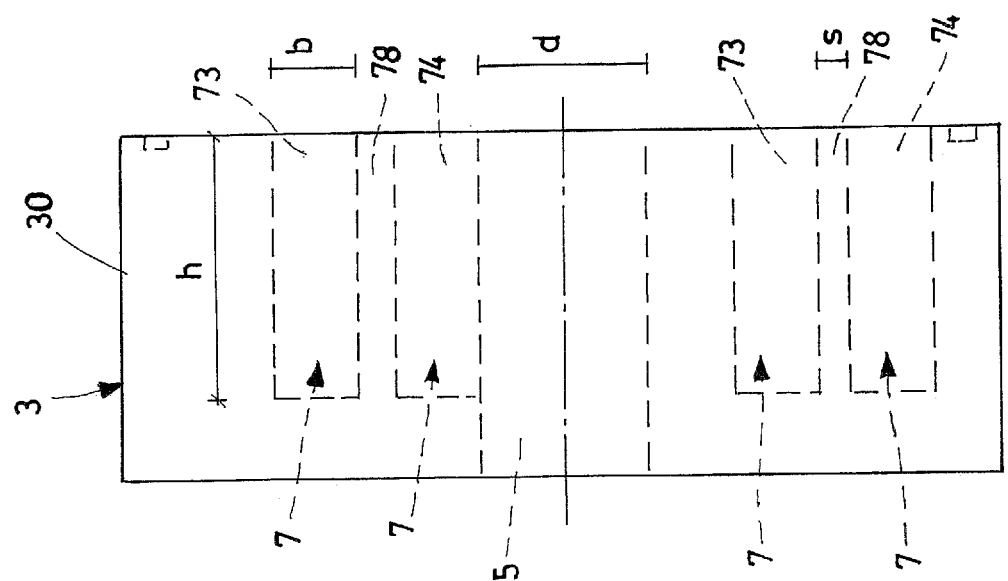
FIG. 4 is a top side view of the main component of the attenuation device of FIG. 1, according to the invention.

As illustrated in FIG. 4, two sections 73, 74 of the duct 7 (or of the duct 9) having substantially rectangular section are separated by a shared separation wall 78 also having substantially rectangular section.

In this way, as explained hereinafter, the shared separation wall 78 can be approximated to a foil a base end of which is locked to the structure of the rigid body 3 and an opposite end of which is free to flex through the action of the pressurized fluid present in the duct 7 (or in the duct 9).

Advantageously, the section of the opening that puts the pass-through duct 5 in communication with the first duct 7 and/or with the second duct 9 also has a substantially rectangular configuration.

As illustrated in FIG. 4, the long side of the section of the first duct 7 (and/or of the second duct 9), indicated with h, is oriented in the direction of the pass-through duct 5.

Advantageously, the area of the rectangle that defines the cross section of the first duct 7 (and/or of the second duct 9) is linked to the area of the section of the pass-through duct 5 by the following formula:

$$b*h=\pi*(d/2)^2$$

Advantageously, the ratio between the height h and the base b of the rectangle is between 2.5 and 4.5, preferably between 2.75 and 4, and even more preferably between 3 and 3.5.

Figure 3:
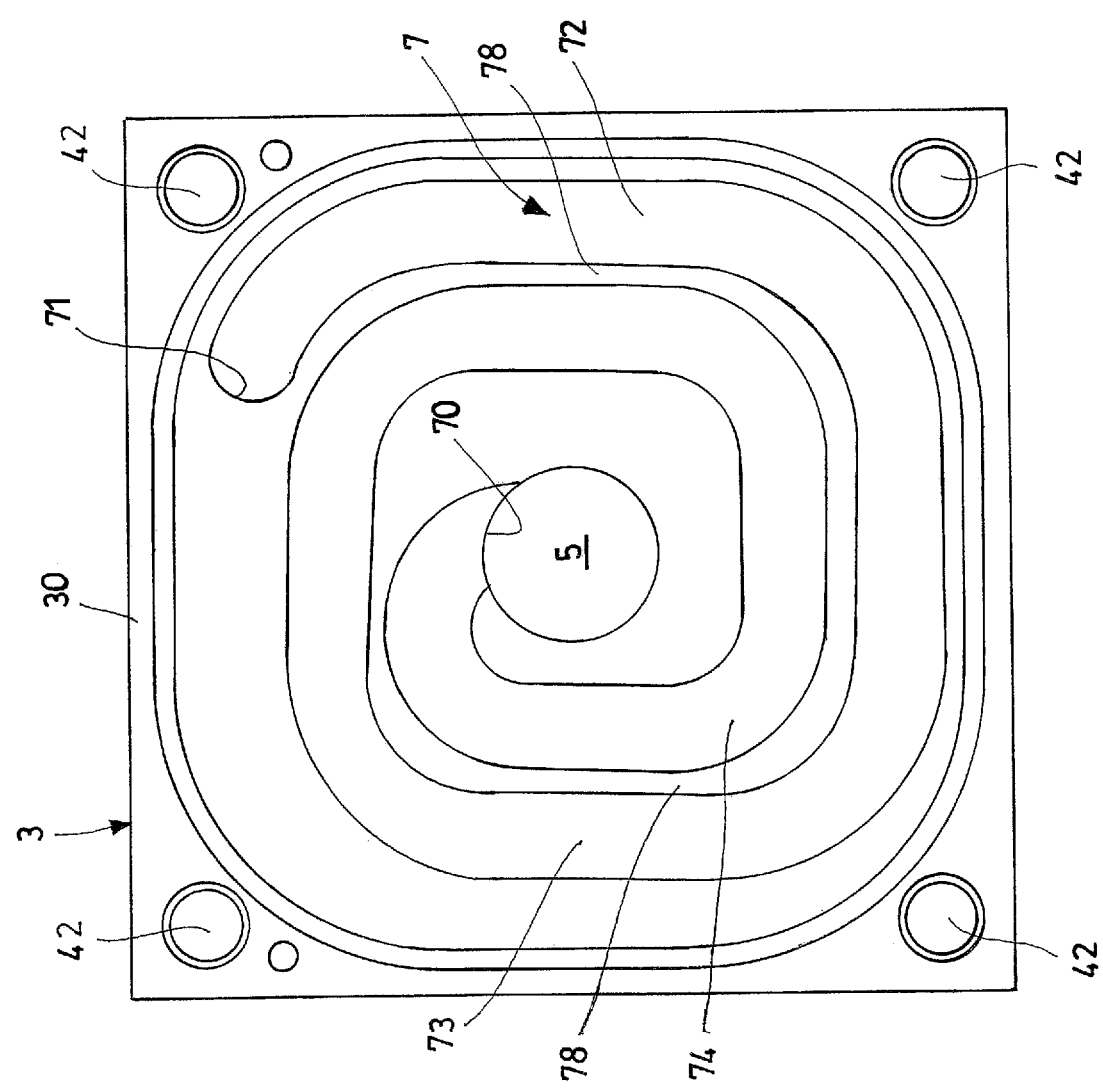
FIG. 3 is a top front view of the main component of the attenuation device of FIG. 1, according to the invention.

Advantageously, as also illustrated in FIGS. 3 and 4, the thickness s of the wall 78 that separates two curved sections 73, 73 of the duct 7 (or of the duct 9) is less both than the size of the width b and than the height h of the cross section of the duct 7 (or of the duct 9).

The fact that a low thickness s of the walls 78 that separate the various sections 73, 73 of the duct 7 (or of the duct 9) is provided makes it possible to make such walls 78 compliant towards a pressure difference between a section 73 of the duct 7 and a section 74 of the duct 7 separated by the shared wall 78.

This compliance has the purpose of allowing the total volume of the duct 7 (or of the duct 9), wound in a spiral or compacted in one of the other embodiments, to react to a cyclical pressure change (i.e. wave) of the fluid almost as if it was a single volume. In this way, the compartment defined by the duct 7 (or by the duct 9) reacts in part like a ¼ wave filter, in other words like a lambda/4 resonator, and in part like a Helmoltz resonator, thus amplifying the band of frequencies that can be attenuated by the attenuation device 1.

The choice of a material having a relatively low elastic modulus, like for example aluminum, which has an elastic modulus of about ⅓ that of steel, is preferable, precisely by virtue of the greater compliance that is thus given to the wall 78.

Advantageously, the thickness s of the wall 78 can be within the range between 0.15 and 0.35 times the width b of the cross section of the duct 7 (or of the duct 9) and/or within the range between 0.05 and 0.15 the height h of the cross section of the duct 7 (or of the duct 9). Preferably, such a thickness s is within the range between 0.2 and 0.3 times the width b of the cross section and/or within the range between 0.1 and 0.15 the height h of the cross section.

The criterion to keep in mind for the sizing of the thickness s of the wall 78 is that of making the change in volume of the fluid, which we can call ΔVp, caused by a pressure change (linked to the bulk modulus B of the fluid) comparable to the change in volume caused by the inflection of the wall 78 when subjected to the same pressure difference, a change in volume that we can call ΔVd.

As stated above, the wall 78 can be exemplified as a foil locked at its own base and free to flex at the opposite end. The flexing of the foil thus determines a change in volume present respectively at the opposite sides of the foil itself.

By increasing the deformability of the wall 78 (for example decreasing the thickness s thereof), the value ΔVd increases with respect to ΔVp and the propensity of the duct 7 to behave as a Helmoltz resonator rather than as a ¼ wave filter is greater. It is therefore possible to write (for a certain bulk modulus B of the fluid) that:

$$\Delta Vp=(\Delta V*\Delta p)/B$$

where ΔV is the change in volume due to the flexing of the wall 78 and Δp is the pressure difference of the fluid.

Approximating, as stated, the wall 78 of thickness s with a foil locked at its base it is easy to calculate the change in volume ΔV and to proportion the thickness s so that this change in volume ΔV is suitably proportioned to the change in volume ΔVp caused by the pressure difference Δp on the fluid itself.

The indicated parameters are valid for a hydraulic oil that in average operating conditions has a bulk of value that can be assumed in first approximation as B=1200 MPa (this value changes with the air content and with the pressure) and for an aluminum or aluminum alloy structure where the central duct 5 is of the order of 25 mm in diameter. Advantageously, therefore, the thickness s of the wall 78 can be selected as a function of the ratio between the change in volume of the fluid caused by the pressure difference on the fluid itself and the change in volume defined by the deformation of the wall 78 carried out by said pressure difference on the fluid, where the deformation of the wall 78 depends both on the geometry of the wall 78 itself and on the material from which it is made. In this way, it is possible to keep the change in volume due to the compressibility of the fluid and the change in volume due to the deformation of the separation wall 78 of substantially comparable size.

Indeed, the thickness s of the wall that separates the adjacent sections of the first duct 7 (and/or of the second duct 9) is advantageously also selected as a function of the elastic modulus of the material from which the rigid bodies 30, 31, 32 are made and as a function of the components in frequency of the pulsations generated by the pump.

Advantageously, the thickness s of the wall 78 that separates the adjacent sections 73, 74 of the first duct 7 (and/or of the second duct 9), in particular in the case of spiral ducts, is not constant along the entire extension of the duct, but has localized and periodic increases. In such portions with increased thickness, the thickness is preferably between 1.4 and 2.5 times the base thickness, more preferably between 1.55 and 2.2 times and even more preferably between 1.7 and 2 times.

Advantageously, as illustrated in FIGS. 12 to 15, the attenuation device 1 comprises one or more passages 20, 21, 22, 23 adapted for putting the fluid present in different sections of the first duct 7 in fluid communication.

Such passages further promote the behavior of the attenuation device 1 as a Helmoltz resonator, as well as a ¼ wave filter.

Advantageously, the attenuation device 1 can also comprise one or more passages adapted for putting the fluid present in different sections of the second duct 9 in fluid communication.

Figure 12:
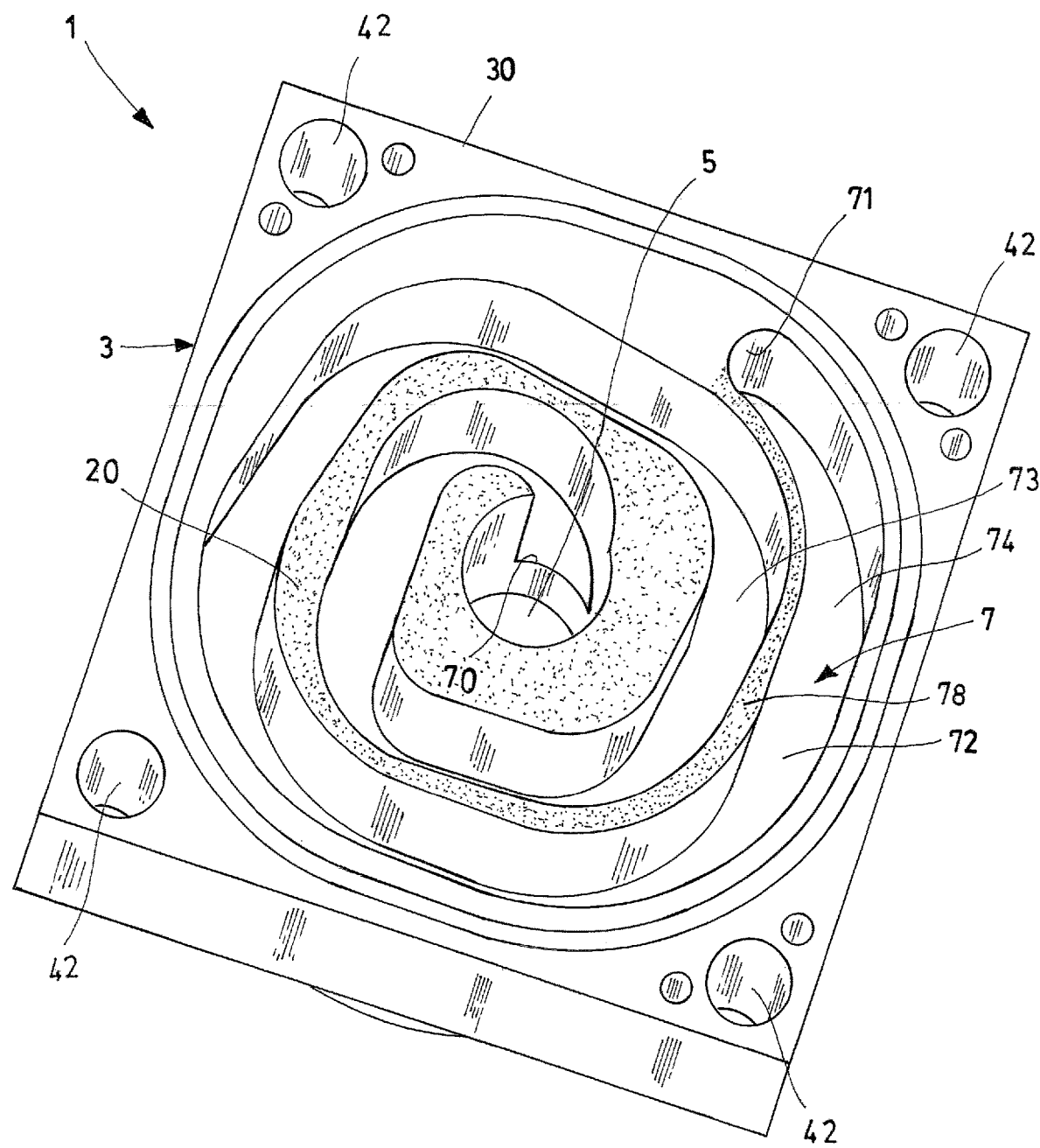
FIG. 12 is a perspective view of a variant of the main component of the attenuation device, according to the invention.

As illustrated in FIG. 12, the attenuation device 1 can comprise a passage defined by a depression 20, represented in the figures with dots, of the upper edge of the walls 78 that define the duct 7 itself, so that a part of the fluid present in some sections of the duct 7 can go over such walls 78 to go into different sections of the duct 7.

Figure 13:
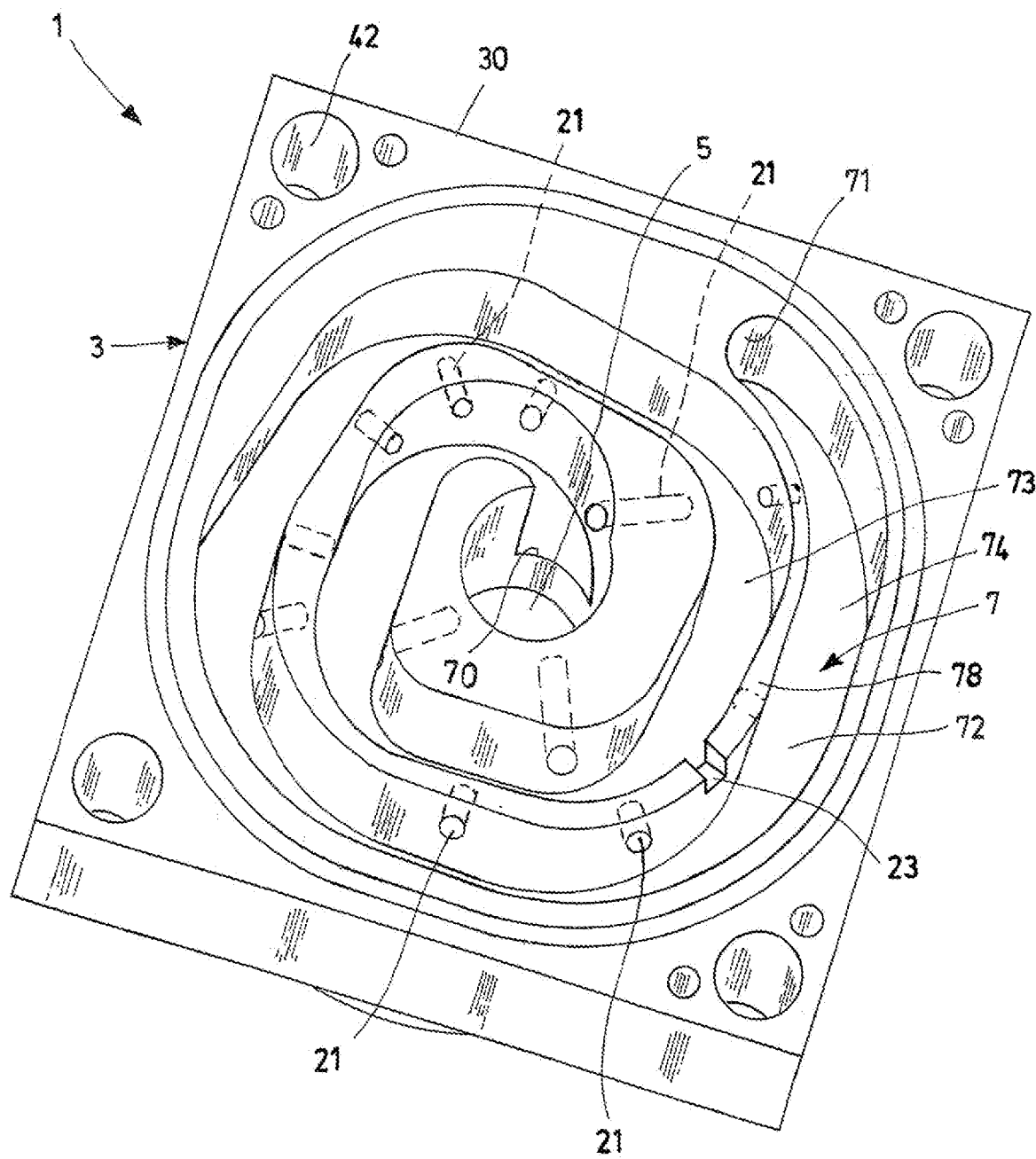
FIG. 13 is a perspective view of a further variant of the main component of the attenuation device, according to the invention.

As illustrated in FIG. 13, the attenuation device 1 can comprise a plurality of passages defined by through holes 21 through the walls 78.

Alternatively to the through holes 21, the passages can be defined by slits or notches obtained in the walls 78.

Preferably, the attenuation device 1 comprises a plurality of passages defined by localized depressions 23 of the upper edge of the wall 78. In FIG. 13 for the sake of simplicity, a single localized depression is illustrated and indicated with reference numeral 23. Localized depressions 23 are indeed preferable due to the fact that they are easier to make in practice.

Figure 14:
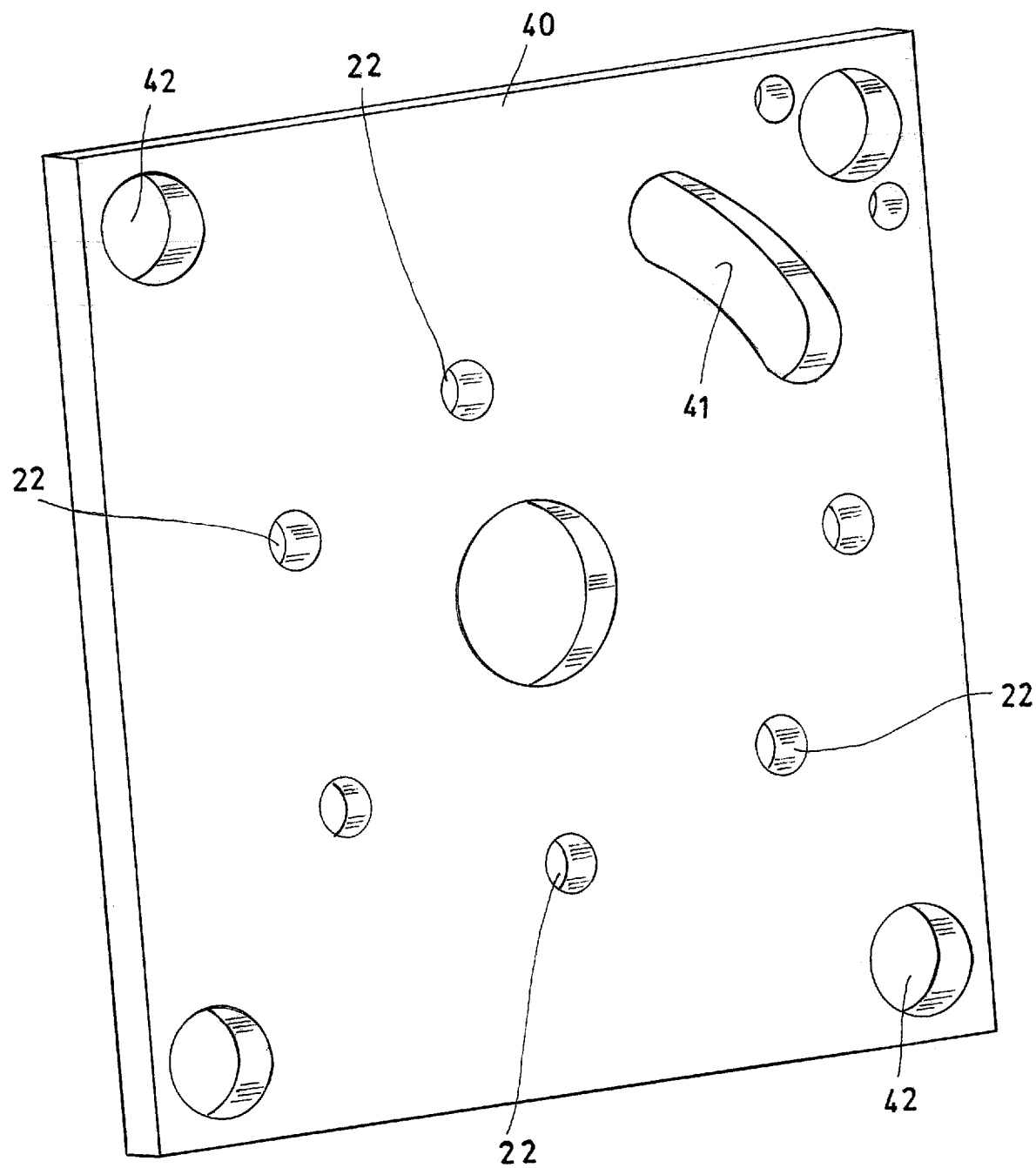
FIG. 14 is a perspective view of a variant of the secondary component of the attenuation device, according to the invention.
Figure 15:
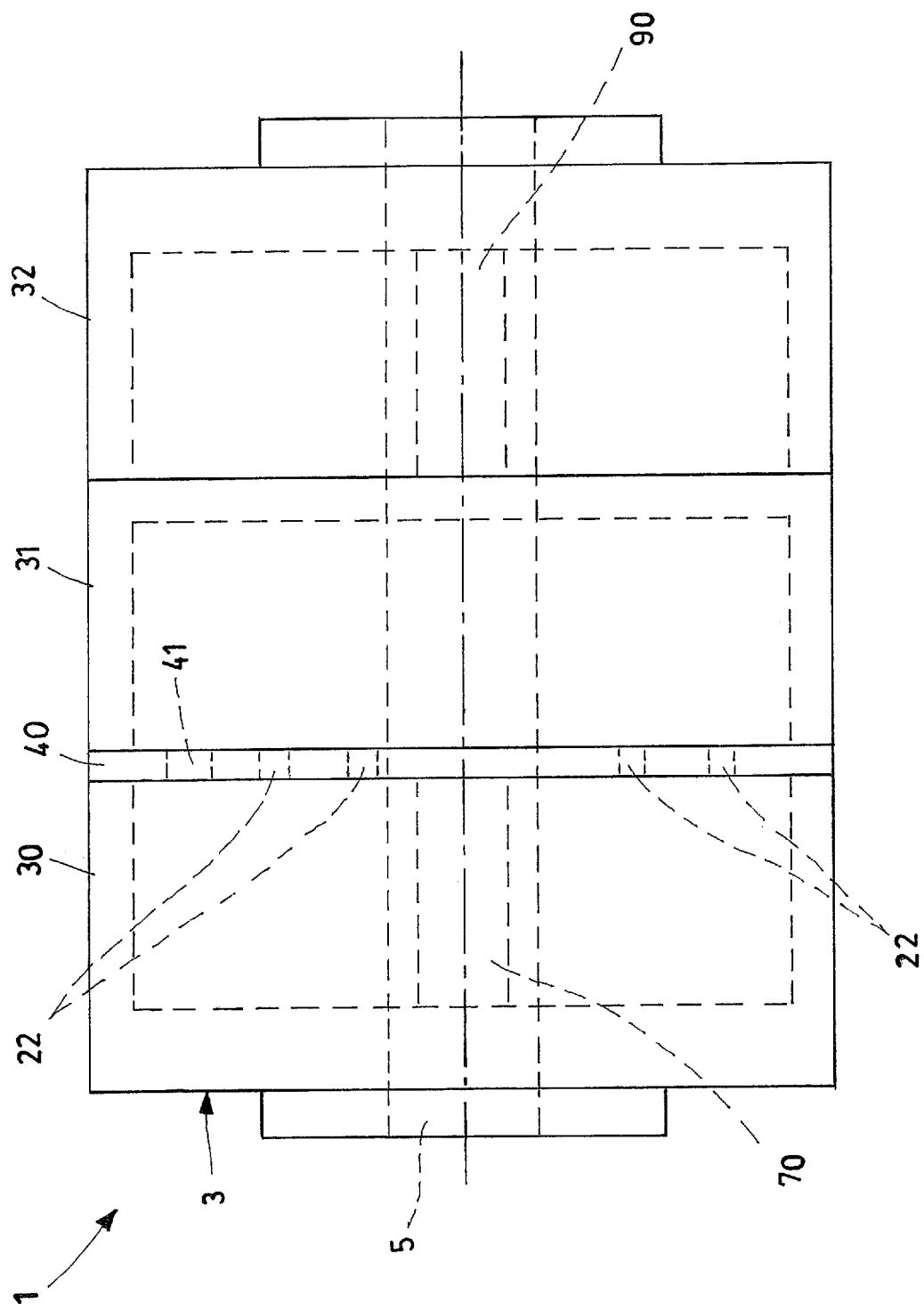
FIG. 15 is a top side view of a variant of the attenuation device, according to the invention, provided with the secondary component illustrated in FIG. 14.

As illustrated in FIGS. 14 and 15, in particular in the case in which the first duct 7 is obtained along the two rigid bodies 30 and 31, the passages 22 can be defined by a plurality of through-holes passing through the connection plate 40 and such as to put sections of the first duct 7 present in the first rigid body 30 in fluid communication with sections of the first duct 7 present in the second rigid body 31.

Advantageously, the first rigid body 30 and the second rigid body 31, as well as the connection plate 40, can be fixed to one another for example by means of screws, and respective bolts, passing through the through holes 42 that pass through the aforementioned components 30, 31 and 40.

Alternatively, the first rigid body 30 and the second rigid body 31, as well as the connection plate 40, can be fixed to one another by means of screws, preferably by means of four screws positioned approximately at the vertices of the square section of the relative rigid bodies 30, 31, where, as stated above, the square section gives a more substantial deformability to the assembled attenuation device 1.

Preferably, it is foreseen for it to be possible to change the pretensioning of the screws through the adjustment of the clamping torque, so as to give a desired axial elastic compliance to the fastening screws.

As illustrated in the attached figures, the holes 42 for the fastening screws are preferably arranged at the vertices of the rigid bodies 30, 31.

In practice, it has been noted how the attenuation device, according to the present invention, achieves the aim as well as the predetermined objects since it makes it possible to efficiently damp the pulsation of a flow of fluid pumped by a volumetric pump, moreover, thanks to the presence of a through hole in line with the delivery pipe of the pump, without causing load losses.

Another advantage of the attenuation device, according to the invention, consists of the fact that the spiral shape of the ducts, as well as compacting the necessary length of the duct as much as possible in the volume, makes it possible to have volumes separated by thin walls that even with the rigidity greater than that of the fluid by itself, can have a further way of resonating in turn like a single volume, giving a further contribution to the attenuation of the pulsations.

The attenuation device thus conceived can undergo numerous modifications and variants, all of which are encompassed by the inventive concept; moreover, all of the details can be replaced by technically equivalent elements. In practice, the materials used, as well as the sizes, can be whatever according to the technical requirements.

In practice, the materials used, provided that they are compatible with the specific use, as well as the contingent shapes and sizes can be any according to requirements.

The invention claimed is:

1. An attenuation device for a fluid flow pulsation along a duct of a hydraulic circuit connected with a hydraulic machine, comprising at least an attenuation module passed through by a pass-through duct configured to be placed in fluid communication with said duct of said hydraulic circuit, wherein in said attenuation module a first duct is obtained having an opened first end in fluid communication with said pass-through duct, and a closed second end, said first duct extending between said opened first end and said closed second end along a curved line comprising a plurality of curved sections, wherein at least two curved sections of said first duct are separated from one another by a shared separation wall configured to be compliant towards a pressure difference between a first section and a second section of said at least two curved sections separated by said shared separation wall, said first duct being adapted to attenuate the pulsation of said fluid flow along said duct of said hydraulic circuit to reduce the vibrations generated by said pulsation of said fluid flow.

2. The attenuation device according to claim 1, wherein the length (L1) of the extension of said first duct is substantially equal to ¼ of the wavelength of the main component of the wave of said pulsation of said fluid flow.

3. The attenuation device according to claim 1, wherein said first duct extends along a spiral curved line.

4. The attenuation device according to claim 1, wherein said first duct extends along at least two spiral curved lines in mutual communication with one of its ends.

5. The attenuation device according to claim 1, wherein said first duct extends along a curved serpentine line.

6. The attenuation device according to claim 1, wherein in said attenuation module a second duct is obtained having an opened first end in fluid communication with said pass-through duct, and a closed second end, said second duct extending along a curved line comprising a plurality of curved sections, said second duct being adapted to attenuate the second-order pulsation of the pumped flow from said volumetric pump to reduce the vibrations generated by said pulsation of said fluid flow.

7. The attenuation device according to claim 6, wherein the length (L2) of the extension of said second duct is substantially equal to ⅛ of the wavelength of the main component of the wave generated by said pulsation of said fluid flow.

8. The attenuation device according to claim 6, wherein said second duct extends along a spiral or serpentine curved line.

9. The attenuation device according to claim 6, wherein said attenuation module comprises at least a rigid body in which said first duct and/or said second duct is obtained.

10. The attenuation device according to claim 9, wherein said attenuation module comprises a pair of mutually associated rigid bodies, a first portion of said first duct being obtained in a first rigid body of said pair of rigid bodies, a second portion of said first duct being obtained in a second rigid body of said pair of rigid bodies.

11. The attenuation device according to claim 10, wherein said attenuation module comprises a third rigid body in which said second duct is obtained.

12. The attenuation device according to claim 1, wherein the area of the cross section of said first duct is substantially equal to the area of the cross section of said pass-through duct.

13. The attenuation device according to claim 1, wherein the cross section of said first duct is rectangular, and the ratio between the height (h) and the base (b) of said rectangular section is between 2.5 and 4.5.

14. The attenuation device according to claim 1, wherein the input mean angle ($\alpha$) of said first duct, in said pass-through duct is between 20° and 60°.

15. The attenuation device according to claim 10, wherein said first duct extends along two spiral lines respectively obtained in said first rigid body and in said second rigid body and having the same direction so that, when said first rigid body and said second rigid body are mutually faced, said two spiral lines have opposite directions.

16. The attenuation device according to claim 6, wherein the input mean angle ($\alpha$) of said second duct in said pass-through duct has an opposite direction with respect to that of the input mean angle ($\alpha$) of said first duct in said pass-through duct.

17. The attenuation device according to claim 6, wherein said opened first end of said first duct and said opened first end of said second duct are aligned in the direction of the axis of said pass-through duct.

18. The attenuation device according to claim 6, wherein the length (L2) of the extension of said second duct is substantially equal to 1/12 or to 1/16 of the wavelength of the main component of said pulsation of said fluid flow.

19. The attenuation device according to claim 18, wherein it comprises a third attenuation duct with length substantially equal to 1/16 of said wavelength.

20. The attenuation device according to claim 1, wherein it comprises one or more passages adapted for putting the fluid present in different sections of said first duct in fluid communication.

21. The attenuation device according to claim 6, wherein the cross section of said first duct and/or of said second duct is substantially rectangular, the thickness (s) of said wall is within the range between 0.15 and 0.35 times the width (b) of said cross section and/or within the range between 0.05 and 0.15 times the height (h) of said cross section.

22. The attenuation device according to claim 1, wherein the thickness (s) of said wall is selected as a function of the ratio between the change in volume of the fluid caused by the pressure difference on the fluid and the change in volume defined by the deformation of said wall carried out by said pressure difference on the fluid to keep the volume change due to the compressibility of the fluid and the volume change due to the deformation of said separation wall of substantially comparable size.

23. The attenuation device according to claim 10, wherein said rigid bodies of said pair of rigid bodies are associated with each other in the flow direction of the fluid inside said central duct and have a cross section that is polygonal.

24. The attenuation device according to claim 23, wherein it comprises a plurality of fixing means of said rigid bodies arranged at the vertices of said polygonal cross section.

25. The attenuation device according to claim 6, wherein the area of the cross section of said second duct is substantially equal to the area of the cross section of said pass-through duct.

26. The attenuation device according to claim 6, wherein the cross section of said second duct is rectangular, and the ratio between the height (h) and the base (b) of said rectangular section is between 2.5 and 4.5.

27. The attenuation device according to claim 6, wherein the input mean angle ($\alpha$) of said second duct, in said pass-through duct is between 20° and 60°.

* * * * *